United States Patent [19]

Dalrymple

[11] 3,707,998
[45] Jan. 2, 1973

[54] DUST COLLECTOR SHROUD

[76] Inventor: Jerry C. Dalrymple, 5192 Princeton, Westminister, Calif. 90023

[22] Filed: June 28, 1971

[21] Appl. No.: 157,188

[52] U.S. Cl. .................................141/93, 214/17 B
[51] Int. Cl. ...............................................B65g 69/18
[58] Field of Search....141/44, 59, 93, 285, 290, 310, 141/312, 392; 144/252 R, 252 A; 214/17 B; 259/161, 172, 175, 176; 302/59

[56] References Cited

UNITED STATES PATENTS

| | | | |
|---|---|---|---|
| 2,850,049 | 9/1958 | Lomax | 141/310 X |
| 3,096,704 | 7/1963 | Russell | 141/93 X |
| 3,438,681 | 4/1969 | Lunde | 302/59 X |
| 3,476,439 | 11/1969 | Homan | 302/59 X |

Primary Examiner—Edward J. Earls
Attorney—Lyon & Lyon

[57] ABSTRACT

A collapsible shroud prevents the escape of cement dust or other dust into the atmosphere when filling a transit mix concrete truck from a batch plant loading station. The shroud is raised to provide clearance for positioning the truck and its filler member relative to the discharge chute of the batch plant. The shroud is made of accordion-pleated material, and is movable about a pivot to encompass and loosely enclose the exposed portion of the truck filler member. A suction tube extends into the interior of the shroud for removing dust generated during gravity discharge of materials from the discharge chute into the filler member. The shroud may contain small apertures for air entry to prevent buildup of dust on the inner walls of the shroud.

7 Claims, 7 Drawing Figures

PATENTED JAN 2 1973 3,707,998

INVENTOR
JERRY C. DALRYMPLE
BY Lyon Hyon
ATTORNEYS

PATENTED JAN 2 1973 3,707,998
SHEET 2 OF 2
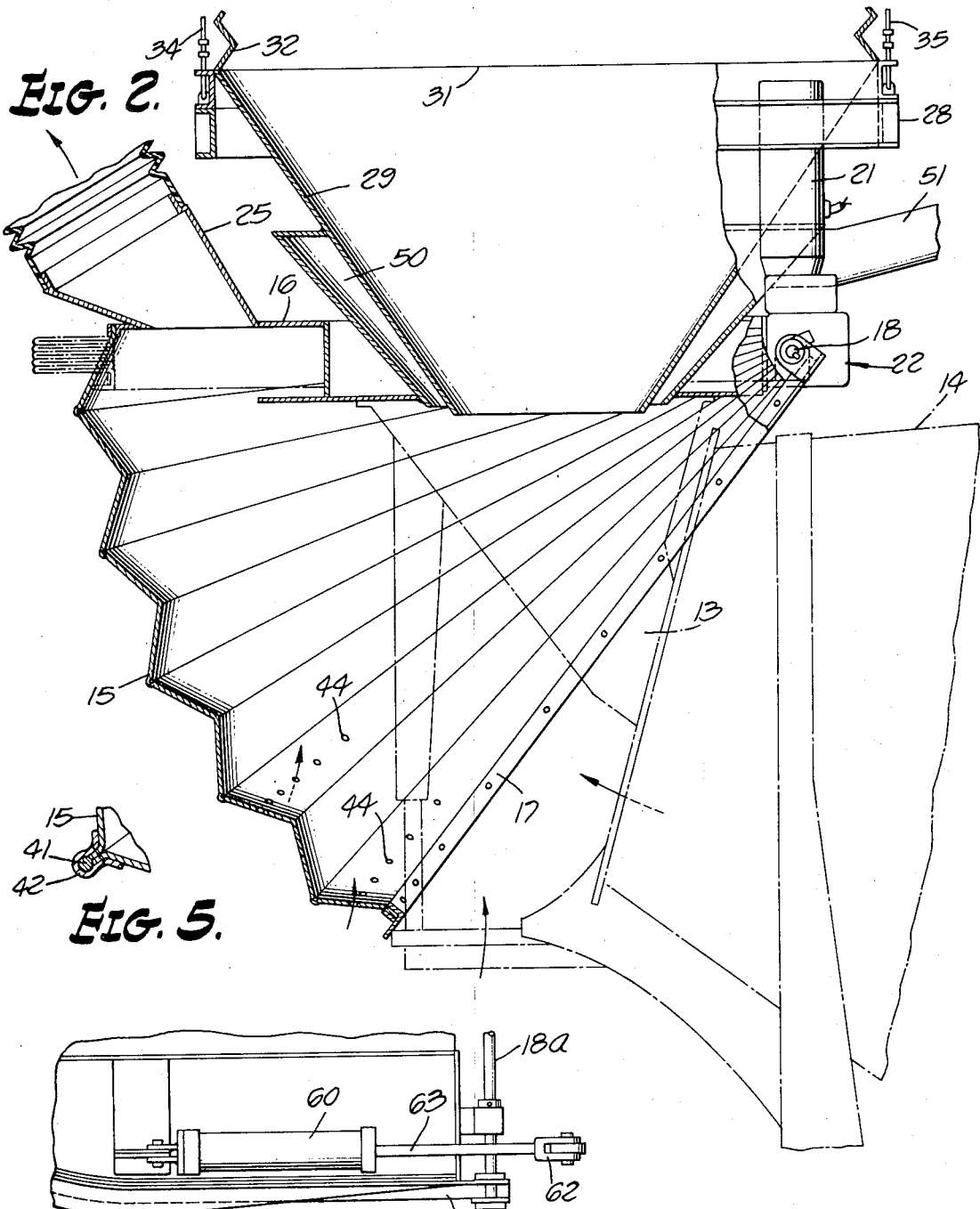
FIG. 2.
FIG. 5.
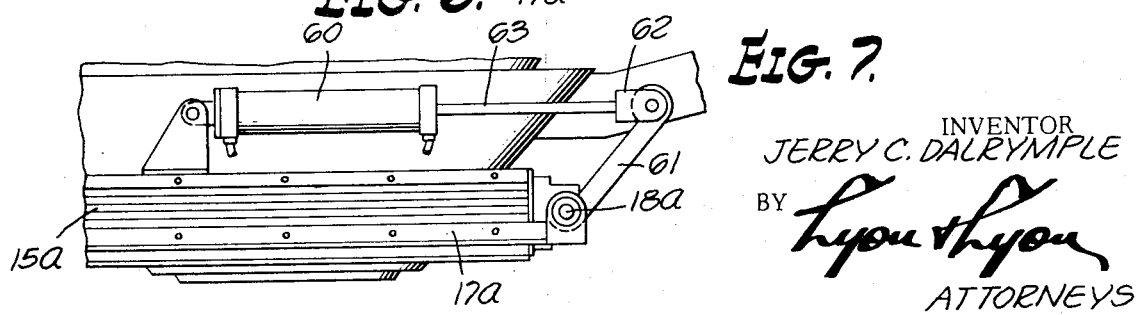
FIG. 6.
FIG. 7.
INVENTOR
JERRY C. DALRYMPLE
BY
Lyon & Lyon
ATTORNEYS

DUST COLLECTOR SHROUD

This invention relates to apparatus for minimizing the escape of dust into the atmosphere when filling a mobile container from a supply source of dust-generating materials. More specifically, this invention will be described in connection with a collapsible shroud for preventing escape of cement dust and other dust when charging the rotary drum of a transit mix truck with cement, rock, sand and gravel from a batch plant. The unwanted escape of dust into the atmosphere pollutes the air and has an adverse effect on vegetation in the area. Dry cement dust is particularly objectionable and large quantities are charged into the air when a typical batch plant loads a large number of transit mix trucks each day.

In accordance with this invention, a shroud is mounted on a frame encompassing the discharge chute from the batch plant. The frame may be raised and lowered by power means, as desired. An accordion-pleated dust-containing shroud is carried on the frame and moves upward with it to provide clearance for positioning the transit mix truck relative to the discharge chute. After lowering of the frame and shroud, the shroud is moved relative to the frame to an operative position in which it encompasses and loosely encloses the exposed portion of the filler member which extends into the rotary mixing drum of the truck. A suction tube extends into the interior of the shroud, removing dust generated during gravity discharge of dry materials from the stationary discharge chute into the drum filler member on the truck. In its operative position, the shroud provides clearance spaces between the shroud and the truck for entry of ambient air into the interior of the shroud, so that dust is kept moving within the shroud and flows with the air to the suction tube into conventional dust-collector apparatus.

Other and more detailed objects and advantages will appear hereinafter.

In the drawings:

FIG. 2 shows a portion of FIG. 1 on an enlarged scale, certain parts being shown in vertical section.

FIG. 5 is an enlarged sectional detail showing construction of the accordion-pleated shroud.

FIG. 6 is a plan view partly broken away, showing a modified form of the apparatus.

FIG. 7 is a side elevation of the apparatus shown in FIG. 6.

Figure 1:
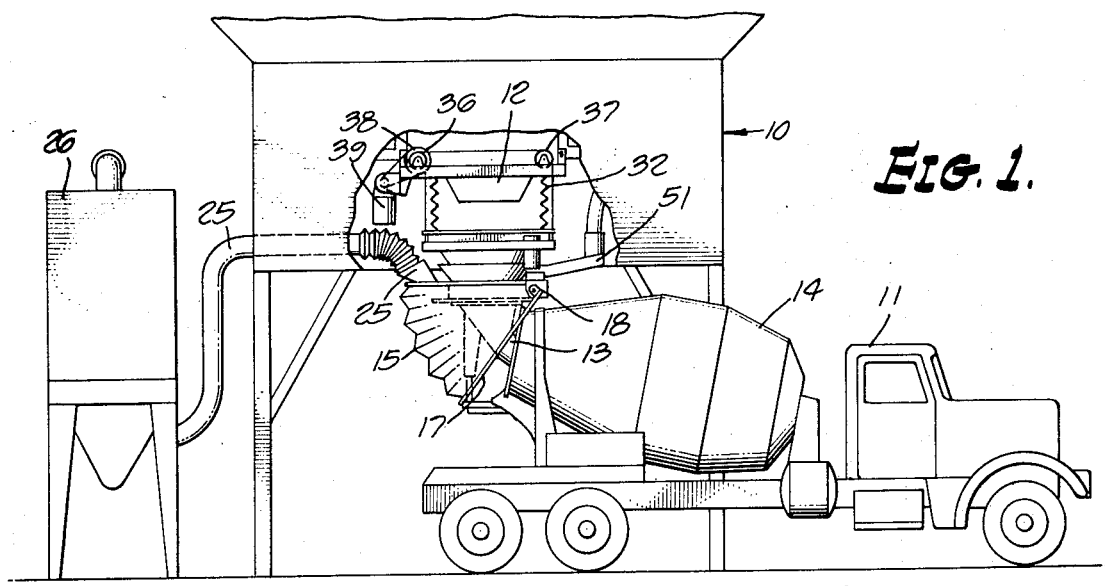
FIG. 1 is a side elevation showing a preferred embodiment of this invention.
Figure 3:
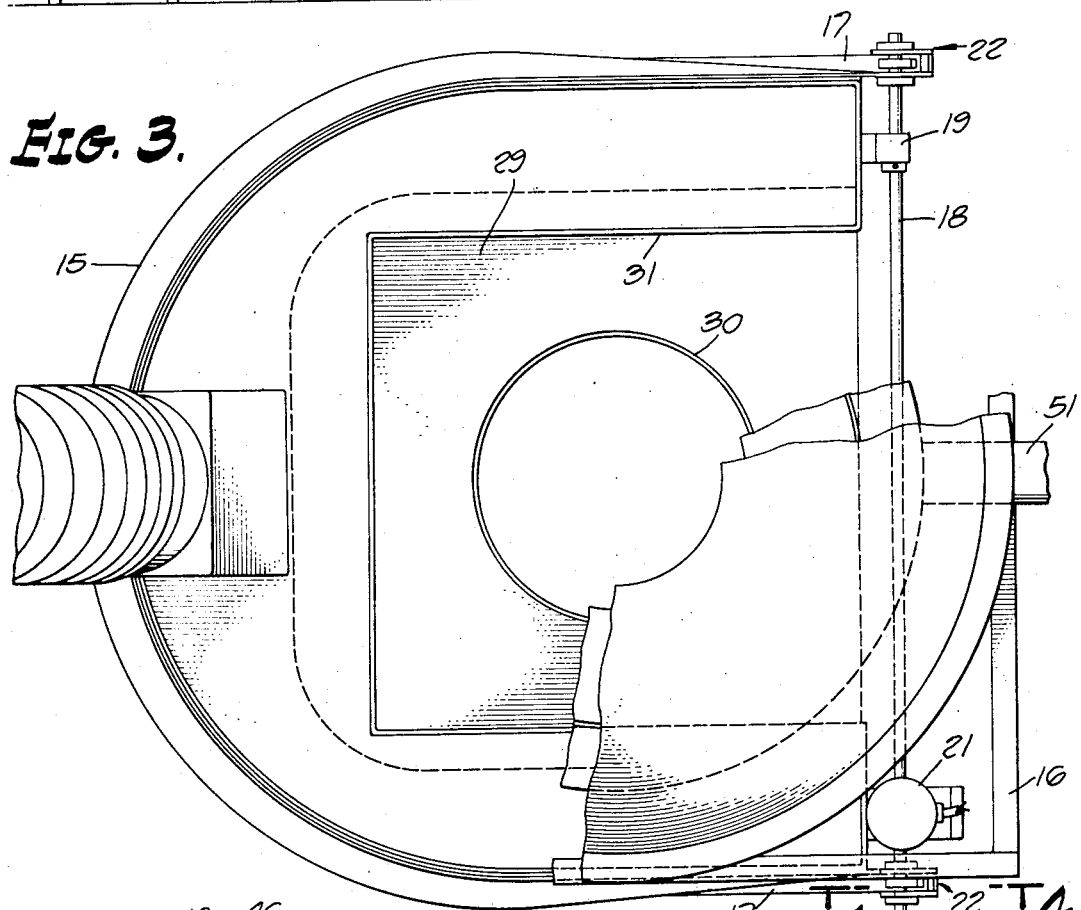
FIG. 3 is a top plan view of the apparatus shown in FIG. 2.

Referring to the drawings, the concrete batch plant generally designated 10 constitutes a materials supply device for loading transit mix trucks 11. The batch plant is provided with a gravity discharge chute 12 through which sand, rock, gravel and dry cement are discharged into the filler member 13 on the truck 11. This filler member extends into the open end of the rotary drum 14 mounted on the truck 11.

In accordance with this invention, a collapsible shroud 15 is movable to a position to prevent escape of dust into the atmosphere while materials are being discharged from the chute 12 on the batch plant 10 into the filler member 13 on the transit mix truck 11. The upper portion of the shroud 15 is fixed to a frame 16 and another portion is fixed to a U-shaped member 17 pivotally mounted on a horizontal shaft 18. The shaft 18 is pivotally mounted in a bearing 19 fixed on the frame 16 and pivotally supported in a gear box also supported on the frame 16. An electric motor 21 acting through the gear box drives the shaft 18 in either direction. Angular lost motion devices 22 provide a driving connection between the shaft 18 and the U-shaped member 17, as described below.

The U-shaped member 17, and the portion of the shroud 15 attached to it, move between a horizontal inoperative position shown by the phantom lines of the shroud in FIG. 2 through an arc in excess of 45° to an operative position shown in full lines in FIGS. 1 and 2. In the operative position, the shroud 15 encompasses and loosely encloses the exposed portion of the filler member 13 on the transit mix truck 11. The loose enclosure does not make a tight seal; on the contrary, there are clearance spaces between the member 17 and the filler member 13 and rotary drum 14 through which spaces air may pass into the interior of the shroud 15. A suction tube 25 extends into the interior of the shroud 15 and is connected to a conventional dust collector 26.

The frame 16 includes a support structure 28 and a tapered guide 29 having a discharge opening 30 which may be aligned with the inlet end of the filler member 13. The large upper open end 31 of the tapered guide 29 receives materials discharged by gravity through the discharge chute 12 of the batch plant 10 (FIG. 1). A bellows assembly 32 prevents escape of dust between the discharge chute 12 and the tapered guide 29. The frame 16 including the support structure 28 and tapered guide 29 is supported on cables 34 and 35 which pass over pulleys 36 and 37 and are wound on a spooling drum 38 driven from an electric motor 39.

The shroud 15 is formed of accordion-pleated material such as, for example, neoprene-coated 22-ounce nylon fabric. The apex of each individual pleat may be constructed in the manner shown in FIG. 5. A U-shaped metallic bow 41 is partially encircled by a non-metallic cover 42 which serves to clamp adjacent edges of the shroud fabric with respect to the bow 41. Air inlet apertures 44 are provided in certain portions of the shroud 15 in order to prevent settling and accumulation of dust on the inside surfaces of the shroud.

Figure 4:
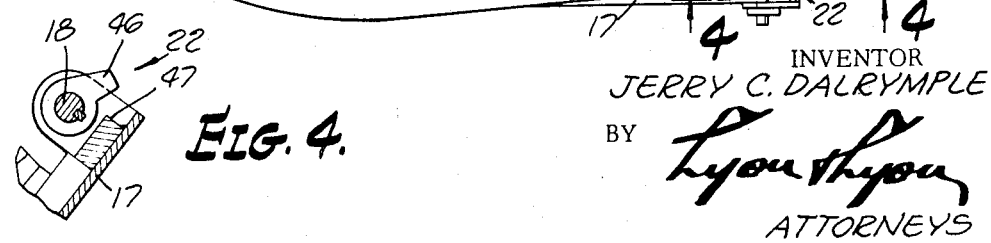
FIG. 4 is a sectional detail taken substantially on the lines 4—4 as shown in FIG. 3.

The angular lost motion devices 22 each includes a lug 46 keyed to the shaft 18 and arranged to engage an abutment 47 mounted on the U-shaped member 17 near its pivoted end. When the electric motor 21 is energized to turn the shaft 18 in a clockwise direction, as viewed in FIG. 4, the lug 46 engages the abutment 47 and causes the U-shaped member 17 to move from the operative position shown in FIGS. 1 and 2 to the inoperative horizontal position shown in phantom lines in FIG. 2. When the shroud is to be returned from inoperative to operative position, the electric motor 21 is rotated in the reverse direction, causing the shaft 18 and lugs 46 to move in a counterclockwise direction, as viewed in FIG. 4. When the U-shaped member 17 strikes a part of the transit mix truck, its pivotal motion is arrested, and the electric motor 20 continues to turn the shaft 18 for a few degrees, separating the lugs 46 from the abutment 47.

If desired, a conical channel 50 may be provided around the outer surface of the tapered guide 29 for introducing water into the filler member 13 on the transit mix truck. The channel 50 may receive water from the supply pipe 51.

In operation, the frame 16 is raised by means of the motor 39 and cables 34 and 35, with the shroud 15 in the horizontal inoperative position. A transit mix truck 11 may then be maneuvered to bring the filler member 13 to a position directly under the gravity discharge chute 12 of the batch plant 10. The frame 16 is then lowered by means of the electric motor 39, to bring the frame 16 to the position shown in FIG. 1. The electric motor 20 is then operated to cause the shaft 18 to turn in a counterclockwise direction, thereby permitting the shroud 15 to move to the operative position in which it loosely encloses the filler member 13 and adjacent portions of the transit mix truck 11. Suction of air through the tube 25 is then commenced, and air enters the interior of the shroud through the clearance spaces between the shroud and the filler member 13 and adjacent portions of the truck 11. Air also enters through the inlet apertures 44 in the shroud 15. A current of air moving toward the suction tube 25 is thus established, and any dust from materials being discharged from the batch plant 10 into the inlet member 13 of the truck 11 is not discharged into the atmosphere but is carried on the current of air through the interior of the shroud and into the suction tube 25. The dust is then collected in the conventional dust collector 26.

When the rotary drum 14 on the truck 11 has received its full charge of materials, the shroud 15 is moved back to its horizontal inoperative position by operation of the pivot shaft 18. The frame 16 and shroud 15 are then lifted to elevated position by means of the motor 39. The transit mix truck 11 may then be driven away from the batch plant 10, and the loading process repeated with another truck.

In the modified form of the invention shown in FIGS. 6 and 7, an air cylinder assembly 60 replaces the electric motor 21 and gear box. The pivot shaft 18a is thus turned by means of a crank arm 61 connected by clevis 62 to the piston rod 63 of the air cylinder assembly 60. In this form of the invention, the angular lost motion devices 22 are not employed, and instead the pivot shaft 18a is directly connected to the U-shaped metallic member 17a which forms a part of the shroud 15a.

Having fully described my invention, it is to be understood that I am not to be limited to the details herein set forth but that my invention is of the full scope of the appended claims.

I claim:

1. For use between the gravity discharge chute of a materials supply device and the filler chute of a mobile container, the improvement comprising, in combination: a frame adjacent said discharge chute, a dust-confining shroud having a first portion fixed to the frame and a second portion pivotally mounted on the frame, means on said frame for pivoting the second portion of the shroud from an inoperative position to an operative position encompassing and loosely enclosing the exposed portion of the filler chute, and a suction means for removing from the shroud dust generated during gravity discharge of materials from said discharge chute into said filler chute.

2. The combination set forth in claim 1 in which the suction means comprises a suction tube extending into the interior of the shroud.

3. The combination set forth in claim 1 in which the shroud is formed of pleated material to permit pivotal movement through an arc extending 45°.

4. The combination set forth in claim 1 in which reversible means are provided on the materials supply device for raising said frame and shroud to provide clearance for positioning the mobile container and filler chute relative to said discharge chute.

5. For use between the gravity discharge chute of a materials supply device and the filler member of a mobile truck, the truck having a rotary mixing drum with an open end receiving the filler member, the improvement comprising, in combination: a frame adjacent said discharge chute, a dust-confining shroud movably mounted on the frame, reversible means on the supply device for raising said frame and shroud to provide clearance for positioning the truck and filler member relative to said discharge chute, means on said frame for moving the shroud from an inoperative position to an operative position encompassing and loosely enclosing the exposed portion of the filler member, and a suction tube extending into the interior of the shroud for removing dust generated during gravity discharge of materials from said discharge chute into said filler member.

6. For use between the gravity discharge chute of a materials supply device and the filler member of a mobile truck, the truck having a rotary mixing drum with an open end receiving the filler member, the improvement comprising, in combination: a frame adjacent said discharge chute, an accordion-pleated dust-confining shroud having a first portion fixed to the frame and a second portion pivotally mounted on the frame, reversible means on the materials supply device for raising said frame and shroud to provide clearance for positioning the truck and filler member relative to said discharge chute, means on said frame for pivoting the second portion of the shroud from a substantially horizontal inoperative position to an operative position encompassing and loosely enclosing the exposed portion of the filler member, the shroud in operative position providing clearance spaces between the shroud and the truck for entry of ambient air into the shroud, and a suction tube extending into the interior of the shroud for removing dust generated during gravity discharge of materials from said discharge chute into said filler member.

7. The combination set forth in claim 6 in which portions of the pleated shroud are provided with air inlet apertures.

* * * * *